(12) United States Patent
D'Acquisto

(10) Patent No.: US 6,547,035 B1
(45) Date of Patent: Apr. 15, 2003

(54) LADDER MODULE

(76) Inventor: Andrae T. D'Acquisto, 3314 E. Grange, Cudahy, WI (US) 53110

( * ) Notice: Subject to any disclaimer, the term of this patent is extended or adjusted under 35 U.S.C. 154(b) by 0 days.

(21) Appl. No.: 09/315,436

(22) Filed: May 20, 1999

(51) Int. Cl.[7] .............................. E04G 3/00; E06C 9/00
(52) U.S. Cl. ......................................... 182/100; 182/93
(58) Field of Search ........................... 182/8, 9, 91, 93, 182/100, 133, 136, 187, 206, 214

(56) References Cited

U.S. PATENT DOCUMENTS

| | | | |
|---|---|---|---|
| 3,149,695 A | * 9/1964 | Pianka et al. .................. 182/91 |
| 3,336,999 A | 8/1967 | McSwain | |
| 3,995,714 A | 12/1976 | Brookes et al. | |
| 4,132,288 A | * 1/1979 | Bingham .................. 182/91 X |
| 4,263,983 A | * 4/1981 | Norton ................... 182/100 X |
| 4,432,436 A | * 2/1984 | Suiter ..................... 182/100 X |
| 4,467,890 A | 8/1984 | McCallum et al. | |
| 4,620,610 A | 11/1986 | Southard | |
| 4,726,317 A | * 2/1988 | Ritten et al. ............. 182/91 X |
| 4,844,207 A | 7/1989 | Andrews et al. | |
| 5,014,640 A | * 5/1991 | Owen, Sr. ................. 182/91 X |
| 5,040,635 A | * 8/1991 | Strickland .................. 182/100 |
| 5,109,954 A | 5/1992 | Skyba | |
| 5,388,664 A | * 2/1995 | Bator ........................ 182/100 |
| 5,655,623 A | * 8/1997 | Skyba .................... 182/100 X |
| 5,704,448 A | * 1/1998 | Jenkins, Jr. .................. 182/93 |
| 5,752,580 A | * 5/1998 | Jenkins, Jr. ................ 182/100 |
| 5,806,626 A | * 9/1998 | Jenkins, Jr. ................ 182/100 |

FOREIGN PATENT DOCUMENTS

FR          1346424   * 11/1963  .................... 182/8

OTHER PUBLICATIONS

Advertising insert from 1999 Trade Show Issue of *Inside Archery*, dated Jan. 1999.

* cited by examiner

Primary Examiner—Daniel P. Stodola
Assistant Examiner—Hugh B. Thompson
(74) Attorney, Agent, or Firm—Boyle Fredrickson Newholm Stein & Gratz S.C.

(57) ABSTRACT

A ladder module for use in climbing trees, hunting or other purposes. The module includes a support member having a pair of support brackets mounted at the top and bottom ends of the support member. The brackets are generally V-shaped and include a number of teeth on the interior surface of the bracket that engage the tree on which the module is placed to prevent the module from slipping on the tree. The brackets also include a rectangular slot in the center of the bracket that receives a support member from a second ladder module to form a convenient nested carrying arrangement for the ladder modules. The module also includes a releasable securing arrangement for securing the module about the tree. The arrangement comprises a belt having a buckle and a pair of straps removably engagable with a fastener mounted to the support member on the side of the support member opposite the support brackets. The configuration of the securing arrangement allows the belt to be selectively and releasably positioned on the support member to avoid any interference with the belt by limbs or branches extending from the tree. The module also comprises a number of steps rotatably mounted to the support member at the top, center, and bottom of the support member opposite the support brackets. Each step includes a pair of annular shoulders on either side of the step that are engagable with a stop disposed beneath the step, allowing the step to provide a stable, horizontal stepping surface when rotated to either side of the support member.

19 Claims, 2 Drawing Sheets

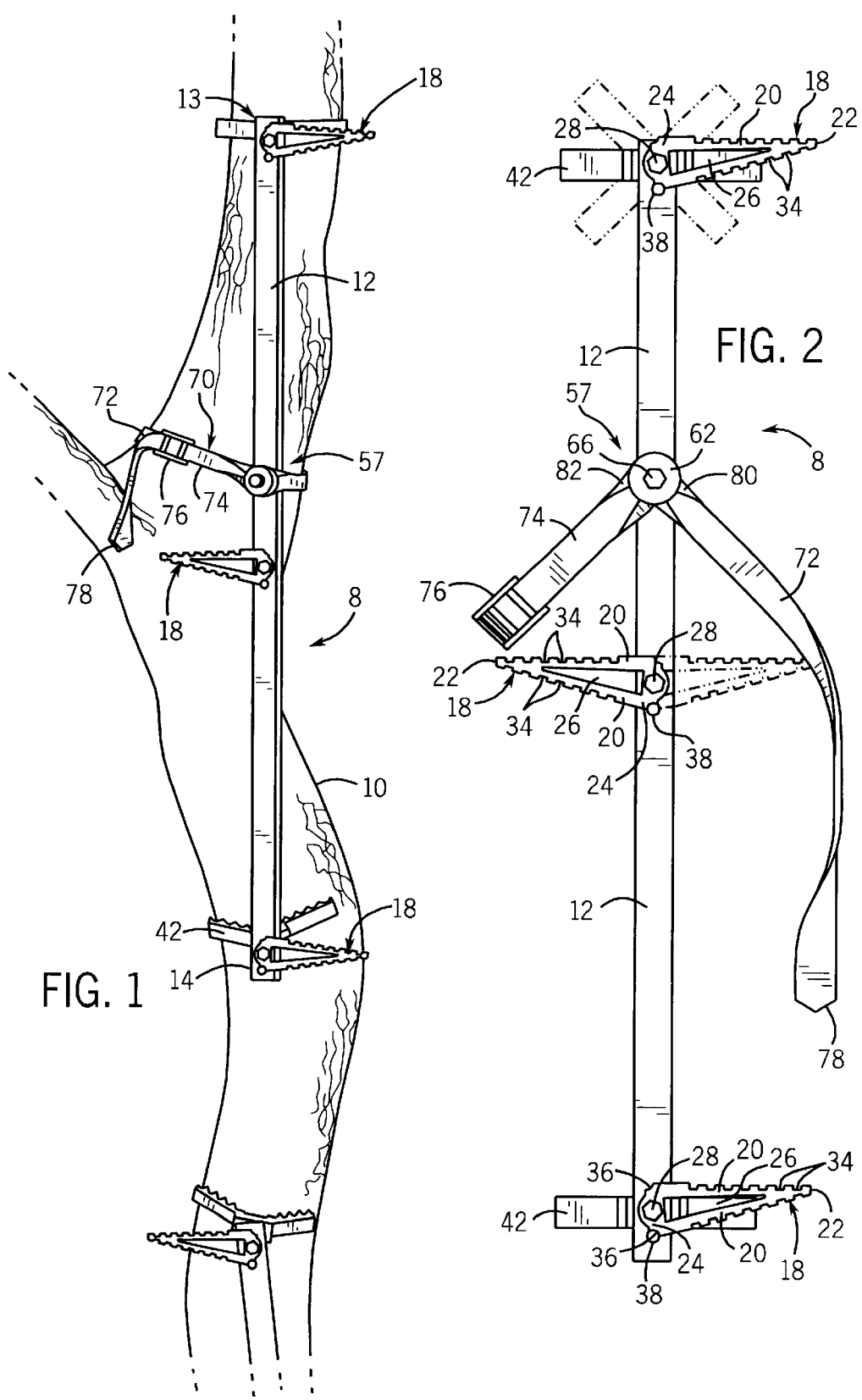

LADDER MODULE

FIELD OF THE INVENTION

The present invention is related to ladders for outdoor use, and more specifically to modular ladders used for climbing trees.

BACKGROUND OF THE INVENTION

In order to hunt wild game such as deer and bears, many hunters find it desirable to place themselves in an elevated position above the animal hunted to prevent detection of the hunter by the animal. To do so, many hunters utilize tree stands that position the hunter in a tree a number of feet above the ground, keeping the hunter out of the typical line of sight of the animal.

As these tree stands are designed to position the hunter in a tree a number of feet above the ground, the problem arises of how the hunter will be able to place both the tree stand and himself in the tree at sufficient distance above the ground. In most cases, an individual will use some type of ladder to reach the portion of the tree on which the tree stand is to be placed. To accommodate the needs of the individual utilizing the ladder, the ladders designed for this purpose should optimally be lightweight, durable,: and easily portable.

The simplest type of ladder that may be used for this purpose is a conventional stepladder, consisting of a pair of parallel rails separated by a number of steps or rungs attached between the rails. The stepladder can be leaned against or placed adjacent a selected tree to allow the individual to secure the hunting stand at the desired level on the tree. However, these conventional stepladders present certain problems when used for this purpose. Due to the size of most stepladders, they become unwieldy when transported into the normally confined environment of a forest where a tree stand is used. Also, the stepladder is not equipped with any type of safety device that reliably secures the stepladder to the tree. Without such a device, there is no way to prevent the ladder from inadvertently sliding off of the tree and injuring an individual using the ladder.

Other types of ladders have been specially designed for use in connection with hunting tree stands to overcome the problems associated with utilizing a conventional ladder. One type of ladder designed specifically for this purpose is disclosed in McSwain U.S. Pat. No. 3,336,999. This combination ladder and hunting stand includes a stand or platform upon which the hunter may sit while hunting, a ladder assembly extending downwardly from one side of the stand to support the stand above the ground, and a clamp mechanism attached beneath the stand opposite ladder assembly for securing the stand and ladder assembly to the trunk of a tree. The ladder assembly is comprised of a number of intermediate ladder sections that are detachable from one another, allowing the ladder assembly to be quickly taken down and placed into a compact, portable arrangement.

While this invention provides a ladder and hunting stand capable of being reliably secured to a tree trunk by the clamp mechanism, the ladder assembly forms a conventional stepladder-like arrangement when assembled. As such, the hunting stand still has problems similar to those associated with a conventional stepladder. For instance, the clamping mechanism will only properly grip the tree when the ladder assembly is placed at an angle commensurate with the tree trunk. When an irregularly shaped tree trunk is not close to perpendicular to the ground at the point at which the clamping mechanism is attached to the tree, the ladder assembly is not able to be positioned perpendicularly to the ground to insure a stable base for the ladder assembly. Therefore, the assembly cannot be utilized with a tree having a trunk that is irregularly shaped. This necessarily limits the number of trees on which the hunting stand disclosed in McSwain may be used. Furthermore, as the ladder assembly is a single, unitary piece when constructed, any limbs or branches extending outwardly from the lower portion of the trunk may also create problems by contacting the assembly and preventing the proper stable positioning of the assembly adjacent the selected tree.

Other types of ladders have been developed for climbing trees that utilize a modular construction that allows the ladders to be utilized with trees having irregularly shaped trunks and/or branches extending from the trunk at a low level, conditions which make ladders having conventional stepladder arrangement unusable.

The individual modules, or climbing sticks, used in forming these ladders have a simple construction comprised of a number of individual alternating steps secured to an elongate tubular support member. The individual steps are pivotably mounted to the support member, allowing the steps to rotate from a closed, vertical position when the module is in transport or is not in use, to an open, horizontal position where the step points outward perpendicular to the support member to provide alternating stepping surfaces for the individual utilizing the module ladder.

Each module is secured to the tree trunk by a securing belt permanently attached at one end by a bolt to one side of the support member. The belt is releasably secured at its opposite end to a belt hook permanently attached to the support member opposite the belt.

The module is supported on the tree by a pair of stabilizing brackets located at the upper and lower ends of the support member. The brackets engage the trunk of the tree to prevent the ladder module from sliding downwardly along the trunk while supporting an individual. The brackets are rotatably mounted to each end of the support member to allow each bracket to independently conform to the direction in which the tree trunk extends.

However, these individual ladder modules still have certain shortcomings. First, the steps each have a stepping surface on only one side of the step. Therefore, in order to laterally position the step to expose the stepping surface, the step must be rotated in a specified direction relative to the support member to present the stepping surface. Due to the location of branches on the trunk of a tree, it may not be possible to rotate one or more of the steps on the support member in the required direction to properly expose the stepping surface as a branch may prevent the complete rotation of the step in that direction.

Similarly, when securing the ladder module to the tree, the permanent attachment of the securing belt at one end to the support member necessitates the securing of the belt to the support member around the tree trunk in only one direction. Again, due to the placement of branches on the trunk of the tree, it may not be possible to properly secure the securing belt around the tree trunk due to interference from the branches.

Lastly, the construction of the individual ladder modules, while being is lightweight and allowing for easy transportation of each modules, does not include any convenient way for connecting individual modules together to form a convenient and portable nested ladder module arrangement.

SUMMARY OF THE INVENTION

The present invention is an improved ladder module, or climbing stick, used by individuals to form a modular ladder for climbing a tree to position and/or reach a tree stand. The module is formed similarly to prior art ladder modules and comprises a set of steps rotatably connected to an elongate tubular support member. The steps have an arrowhead shape and are spaced from each other along the length of the support member to form an upper step, a middle step, and a lower step. Each step includes a grooved stepping surface disposed on both long sides of each step that allow the steps to provide a non-slip stepping surface when rotated to either side of the support member. Also, on both sides of the point of attachment of each step to the support member are located a pair of annular shoulders, capable of restricting the rotation of each step with respect to the support member. Each shoulder engages a stop located beneath the step to selectively position the step outwardly on either side of the support member. This improved step construction allows the ladder module of the present invention to be used in situations where prior art ladder modules could not be used by providing steps that may be rotated in either direction on the support member to avoid any limbs or branches that may obstruct the rotation of the step in one direction.

The improved ladder module also includes a pair of stabilizing brackets attached adjacent the upper and lower ends of the support member opposite the upper and lower steps. Each bracket includes a gripping surface having a number of teeth opposite the support member to engage the surface of a tree on which the ladder module is mounted. The brackets are also rotatably mounted to the support member, allowing the brackets to conform to the contours of an irregularly shaped tree trunk with which the brackets are engaged. Furthermore, the gripping surface on the brackets opposite the support member is milled to provide a slot into which support members from other ladder modules may be inserted in order to assemble a multitude of ladder modules in a nested module arrangement.

Another feature of the improved ladder module of the present invention is a securing arrangement attached to the support member used to secure the module to the tree. The arrangement includes a belt fastener disposed on the support member between the upper step and the middle step. The fastener is comprised of a stem extending outwardly from the support member and a radially extending flange attached to the stem opposite the support member that covers the stem. The flange provides an attachment point for a belt forming the remaining portion of the improved securing arrangement utilized with the ladder module. The belt is comprised of a pair of straps, each including a loop at one end. The loops on each strap are placed over the flange of the fastener to secure the loops to the fastener on the support member. One of the straps includes an adjustable buckle attached to the strap opposite the loop that engages the non-loop end of the remaining strap to releasably secure the belt about the trunk of the tree. The loop and fastener arrangement of the present invention allows the securing belt to be secured about the tree trunk with the buckle positioned on either side of the support member, so that the buckle may be selectively positioned to avoid any limbs, branches or other obstructions that may prevent the securing belt from performing properly. This securing arrangement is also able to be used on other devices utilized by hunters that are secured to a tree, such as tree stands.

The present invention is an improved ladder module that includes a plurality of steps rotatably mounted on a support member that are capable of rotating in either direction with respect to the support member to provide a grooved, non-slip stepping surface on either side of the support member.

The improved ladder module also includes an adjustable securing arrangement for releasably attaching the ladder module to the tree trunk. The arrangement includes a fastener secured to the support member and a securing belt formed of a pair of straps releasably secured to the fastener. This arrangement enables an adjustable buckle located on one strap of the securing belt attached to the module to be placed on either side of the support member, enabling the buckle to be selectively positioned in order to avoid obstructions present on the tree trunk that would otherwise prevent the securing arrangement from functioning properly.

The improved ladder module further provides a milled slot in each of a pair of stabilizing brackets secured adjacent each end of the module that function to receive and retain the support member of a second ladder module to create a convenient nested carrying arrangement for a number of ladder modules.

BRIEF DESCRIPTION OF THE SEVERAL VIEWS OF THE DRAWING

In the drawings:

FIG. 1 is an isometric view illustrating the module ladder of the present invention attached to the trunk of a tree;

FIG. 2 is a front elevation view of the ladder module of FIG. 1;

DETAILED DESCRIPTION OF THE INVENTION

Figure 3:
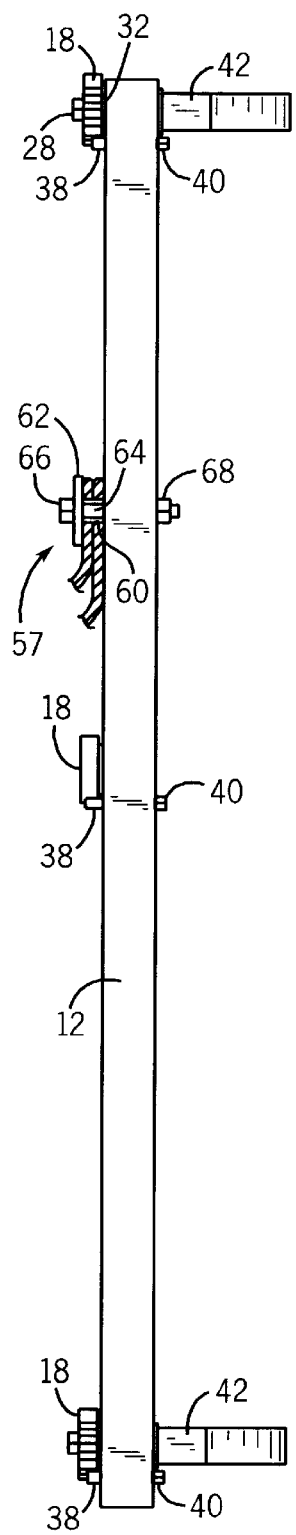
FIG. 3 is a side elevation view of the ladder module of FIG. 1.

FIGS. 1–6 illustrate a ladder module 8 constructed according to the present invention. The module 8 is attached to a tree 10 for use in climbing the tree 10 in the manner illustrated in FIG. 1.

Referring now to FIG. 2, the module 8 includes an elongate support member 12 that functions as the body of module 8. The support member 12 is an elongated square metal tube having a top end 13, a bottom end 14, and a pair of plastic end caps 16 disposed in the top end 13 and bottom end 14 of support member 12. The end caps 16 prevent water and debris from entering into the interior of support member 12.

Figure 4:
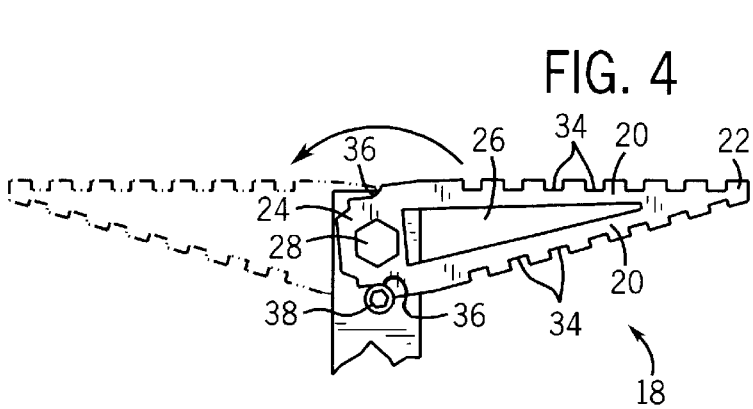
FIG. 4 is a partially broke[]n away front view of the top of the ladder module of FIG. 1.

The support member 12 also includes a number of steps 18 formed of a lightweight metal, preferably aluminum, that are spaced along one side of the support member 12. Each step 18 is rotatably mounted to the support member 12 to provide a stepping surface for an individual using the ladder module 8. Preferably, the steps 18 are mounted to the support member 12 near the top end 13, bottom end 14 of the support member 12 and at the center of the support member 12. As best shown in FIGS. 2 and 4, the steps 18 are generally triangular in shape having a pair of stepping portions 20 connected to each other at one end, forming a pointed end 22, and to opposite ends of a connecting portion 24 opposite the pointed end 22. This configuration allows each step 18 to provide a stepping surface on each stepping portion 20 when the step 18 is rotated to one side of the support member 12. To aid an individual using the steps 18 on support member 12 to climb the tree 10, each stepping portion 20 includes a number of grooves 34 spaced along its length. The grooves 34 provide traction for the foot of the individual utilizing the step 18 to help prevent the foot from slipping off the stepping portion 20 of the step 18. Each step 18 also has a generally open interior 26 between the stepping portions 20 and connecting portion 24 to reduce the weight of each step 18.

Each step 18 is rotatably connected to the support member 12 by a bolt 28 inserted through an opening 29 in the center of the connecting portion 24. The bolt 28 extends through an aligned opening 30 passing through support member 12 and is secured therein by a nut 31 threadably mounted onto the bolt 28 on the side of support member 12 opposite the step 18. To facilitate the movement of each step 18 with respect to the support member 12, a washer 32 formed of a low friction material is preferably disposed between the step 18 and support member 12 around bolt 28.

Each step 18 also includes a pair of curved shoulders 36 disposed in opposite ends of connecting portion 24, as best shown in FIG. 4. When the step 18 is rotated in either direction on support member 12, one of the annular shoulders 36 contacts a stop 38 positioned directly beneath the step 18 on support member 12. Each annular shoulder 36 engages the stop 38 to laterally position the step 18 such that each stepping portion 20 provides a horizontal stepping surface on one side of the support member 12, depending upon the side of support member 12 to which the step 18 has been rotated. The stop 38 is generally formed by the head of a bolt 37 extending through the support member 12 and secured thereto by a nut 40 attached to the bolt 37 on the side of support member 12 opposite the step 18.

Figure 5:
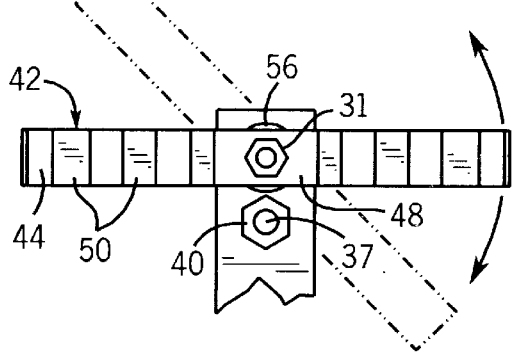
FIG. 5 is a partially broken away rear view of the top of the ladder module of FIG. 1.
Figure 6:
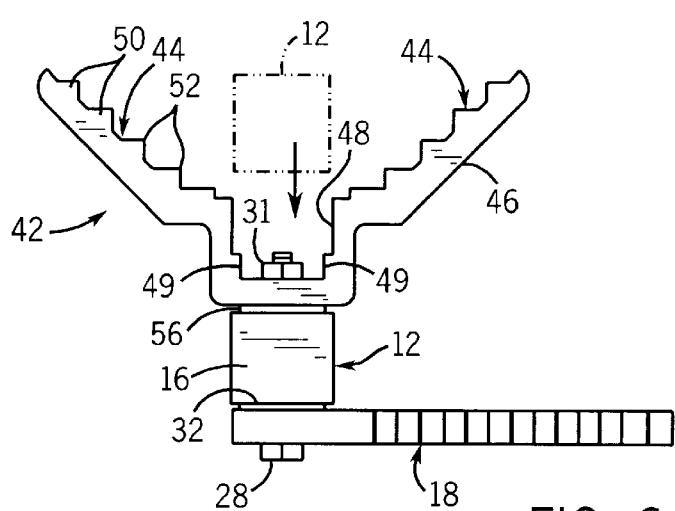
FIG. 6 is a top view of the ladder module of FIG. 1.

Referring now to FIGS. 5 and 6, the support member 12 also includes a pair of support brackets 42 mounted adjacent the top end 13 and bottom end 14 of the support member 12. As best shown in FIG. 6, the brackets 42 are generally V-shaped, including an interior surface 44 and an exterior surface 46. The interior surface 44 of bracket 42 includes a rectangular slot 48 in the center of bracket 42 that has a pair of ridges 49 extending upwardly from the bottom of the slot 48. The slot 48 and ridges 49 are sized to receive the support member 12 of a second ladder module 8 to compactly position the separate modules 8 to form a convenient nested carrying arrangement for the modules 8.

On either side of the slot 48, the interior surface 44 also includes a number of teeth 50 spaced along the length of each side of bracket 42. The teeth 50 are generally triangular in shape having a point 52 extending outwardly from the interior surface 44 of bracket 42. The teeth 50 on bracket 42 engage the trunk of the tree 10 to prevent the module 8 from sliding down the tree 10 when a person is climbing a tree 10 utilizing the module 8.

Looking now at FIGS. 2, 3 and 6, each bracket 42 is secured to the support member 12 opposite the steps 18 located near the top end 13 and bottom end 14 of support member 12. The bolts 28 utilized to secure these steps 18 to the support member 12 are also used to secure the brackets 42 to the support member 12. Each bolt 28 extends through an opening 54 in the center of slot 48 in bracket 42 and is secured therein by the nut 31 which is threaded onto the end of bolt 28 protruding into the slot 48. The bolt 28 and nut 31 attaching the bracket 42 to support member 12 are prevented from contacting the second support member 12 of the second module 8 inserted into slot 48 by the ridges 49 which extend above the level of the bolt 28 and nut 31.

In a manner similar to the steps 18, each bracket 42 is also capable of rotating with respect to the support member 12, as shown in FIG. 5. A washer 56 similar to the washer 32 utilized in connection with each step 18 is positioned between the bracket 42 and the support member 12 to facilitate the rotation of the bracket 42 with respect to the support member 12. The rotation of each bracket 42 is restricted in a manner similar to that for each step 18 using the stops 38 located at the top 13 and bottom 14 of support member 12. The nuts 40 securing the stops 38 within support member 12 restrict the rotation of each bracket 42 by contacting each bracket 42 in the same way as the stops 38 contact the shoulders 36 of the steps 18.

Referring now to FIGS. 1–3, the support member 12 also has a securing arrangement 57 used to hold the module 8 on the tree 10. The arrangement 57 is attached to the support member 12 and includes a belt fastener 58 and a securing belt 70. The fastener 58 is secured to the support member 12 between the steps 18 positioned at the top end 13 of support member 12 and at the center of the support member 12. The fastener 58 includes a cylindrical mounting sleeve 60 extending outwardly from the support member 12 and a circular retaining flange 62 positioned on the mounting sleeve 60 opposite the support member 12. The flange 62 is preferably a metal washer having a diameter significantly greater than the sleeve 60 and including a hole 64 in the center of the flange 62. The sleeve 60 and flange 62 are secured to the support member 12 by a bolt 66 inserted into the support member 12 through the hole 64 in flange 62 and through sleeve 60. The bolt 66 extends through the support member 12 and is secured to the support member 12 opposite the fastener 58 by a nut 68. The fastener 58 provides a point on the support member 12 used to removably attach each end of a securing belt 70 to the support member 12 in order to reliably secure the module 8 to the tree 10, as shown in FIG. 1.

The belt 70 is comprised of a securing strap 72, a buckle strap 74, and a releasable buckle 76. The securing strap 72 is an elongate strap of a durable material, such as nylon, that includes a free end 78 and a loop 80 integrally formed in the strap 72 opposite the free end 78. The securing strap 72 is removably attached to the fastener 58 by placing the loop 80 around the retaining flange 62 of fastener 58. The flange 62 prevents the loop 80 from disengaging from the fastener 58, maintaining the securing strap 72 in attachment, with the support member 12.

The buckle strap 74 is formed of the same material as the securing strap 72 and also includes a loop 82 at one end that is also removably attached to the fastener 58. However, the end of buckle strap 74 opposite the loop 82 is attached to the buckle 76, which is placed around the tree to receive the free end 78 of securing strap 72 to secure the ladder module 8 on the tree 10.

To attach the module 8 to a selected tree 10, first, the securing strap 72 and buckle strap 74 are secured to the fastener 58 on support member 14 so that the securing arrangement 57 and, namely, the buckle 76 on buckle strap 74, will not be obstructed by any limbs extending from the tree 10. Next, the brackets 42 are positioned against the center of the tree 10 to position the support member 12 in a generally vertical direction on the tree 10. The brackets 42 may be rotated with respect to the support member 12 to conform to the shape of the tree 10. Then, the straps 72 and 74 of the securing belt 70 are wrapped around the tree 10 in opposite directions, and the free end 78 of securing strap 72 is inserted through the buckle 76. The securing strap 72 is pulled tight through buckle 76 to securely fasten the securing belt 70 about the tree 10. Finally, each step 18 is rotated with respect to support member 12 to extend one of the stepping portions 20 on step 18 to provide a horizontal stepping surface where desired on one side of the support member 12.

I claim:

1. A ladder releasably securable to a tree, the ladder comprising:
   a) an elongate support member having a top end and a bottom end;
   b) at least two stabilizing brackets mounted to the support member;
   c) at least two steps mounted to the support member opposite the at least two brackets;
   d) at least two stops positioned on the support member adjacent the at least two brackets and the at least two steps; and
   e) at least two fasteners, a respective one inserted through a respective one of the at least two steps, the support member and the at least two brackets.

2. The ladder of claim 1 wherein the at least two steps are rotatable about the at least two fasteners with respect to the support member.

3. The ladder of claim 2 wherein the at least two steps each include a fastener opening through which each of the at least two fasteners is inserted, and a pair of stopping surfaces disposed on either side of the fastener opening and engageable with each of the at least two stops.

4. The ladder of claim 3 wherein the at least two steps are positioned in a first direction to generally perpendicular to the support member when one stopping surface is engaged with one of the at least two stops.

5. The ladder of claim 4 wherein the at least two steps are positioned in a second direction generally perpendicular to the support member and opposite the first direction when the other stopping surface is engaged with one of the at least two stops.

6. The ladder of claim 1 wherein the at least two brackets are rotatable about each of the at least two fasteners with respect to the support member.

7. The ladder of claim 6 wherein the rotation of each of the at least two brackets with respect to the support member is limited by one of the at least two stops.

8. The ladder of claim 6 wherein the at least two steps are rotatable about each of the at least two fasteners with respect to the support member.

9. The ladder of claim 1 further comprising:
   a) an upper stabilizing bracket mounted to the support member adjacent the upper end;
   b) an upper step mounted to the support member opposite the upper bracket;
   c) an upper fastener mounted to the support member and to the upper step and the upper stabilizing bracket;
   d) a lower stabilizing bracket mounted to the support member adjacent the lower end;
   e) a lower step mounted to the support member opposite the lower bracket; and
   f) a lower fastener mounted to the support member and to the lower step and the stabilizing bracket.

10. The ladder of claim 1 wherein the upper and lower stabilizing brackets include a central portion positioned adjacent the support member and having an inner dimension slightly larger than the outer dimension of the support member, wherein the central portion is adapted to receive and engage a second support member of a second ladder.

11. The ladder of claim 10 wherein the central portion is generally U-shaped.

12. The ladder of claim 1 further comprising a securing member fixed to the support member and spaced from the at least one fastener.

13. The ladder of claim 12 wherein the securing member includes:
   a) a hollow stem positioned generally perpendicularly against the support member;
   b) a flange positioned on the stem opposite the support member; and
   c) a connector inserted through the flange and the stem and engaged with the support member to hold the flange and stem on the support member.

14. The ladder of claim 12 further comprising:
   a) a holding strap having a first loop at one end that is releasably engageable with the securing member and a releasable buckle attached to the opposite end; and
   b) a securing strap having a second loop at one end that is releasably engageable with the securing member and a free end opposite the loop that is releasably engageable with the buckle.

15. A ladder releasably securable to a tree, the ladder comprising:
   a) an elongate support member having a number of exterior surfaces;
   b) a fastener inserted through and projecting outwardly from opposed exterior surfaces of the elongate support member;
   c) a stop inserted through and projecting outwardly from opposed exterior surfaces of the support member beneath the fastener and in the same direction as the fastener; and
   d) a step rotatably mounted to the fastener on the support member against only one of the number of exterior surfaces and having first and second opposed stop surfaces engageable with the stop, wherein the step is movable between a first position where the first stop surface engages the stop and the step is positioned generally perpendicular to the one exterior surface of the support member, the second position where the step is positioned generally parallel to the support member, and a third position wherein the second stop surface engages the stop and the step is positioned generally perpendicular to the one exterior surface of the support member and opposite the first position.

16. The ladder of claim 15 further comprising a stabilizing bracket rotatably mounted to the support member and spaced from the step.

17. The ladder of claim 16 wherein the stabilizing bracket is mounted to the fastener opposite the step.

18. A ladder releasably securable to a tree, the ladder comprising:
   a) an elongate support member having a number of exterior surfaces;
   b) a fastener inserted through and extending outwardly from opposed exterior surfaces of the support member;
   c) a stop inserted through and extending outwardly from opposed exterior surfaces of the support member adjacent the fastener;
   d) a step rotatably secured to either the fastener or the stop on the support member against only one of the number of exterior surfaces, the step having first and second opposed stop surfaces engageable with the stop, wherein the step is movable between a first position where the first stop surface engages the stop and the step is positioned generally perpendicular to the one exterior surface of the support member, a second position where the first and second opposed stop surfaces are spaced from the stop and the step is positioned generally parallel to the one exterior surface of the support member, and a third position where the second stop surface engages the stop and the step is positioned generally perpendicular to the one exterior surface of the support member and opposite the first position; and e) a stabilizing bracket rotatably secured to one end of either the fastener or the stop on another of the number of exterior surfaces opposite the step.

19. A ladder releasably securable to a tree, the ladder comprising:

a) an elongate support member having a number of exterior surfaces;

b) a first fastener inserted through and extending outwardly from opposed exterior surfaces of the support member;

c) a stop inserted through and extending outwardly from opposed exterior surfaces of the support member adjacent the first fastener;

d) a step rotatably secured to the first fastener on the support member against only one of the number of exterior surfaces, the step having first and second opposed stop surfaces engageable with the stop, wherein the step is movable between a first position where the first stop surface engages the stop and the step is positioned generally perpendicular to the one exterior surface of the support member, the second position where the step is positioned generally parallel to the one exterior surface of the support member, and a third position wherein the second stop surface engages the stop and the step is positioned generally perpendicular to the one exterior surface of the support member and opposite the first position;

e) a second fastener spaced from the stop and inserted through and extending outwardly from opposed exterior surfaces of the support member; and f) a stabilizing bracket mounted to the second fastener on another of the number of the exterior surfaces opposite the step.

* * * * *